United States Patent
Hsu (10) Patent No.: US 8,201,719 B2
(45) Date of Patent: Jun. 19, 2012

(54) CARRIER FOR BICYCLE

(75) Inventor: Li-Cheng Hsu, Dongshan Township, Yilan County (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 574 days.

(21) Appl. No.: 12/398,648

(22) Filed: Mar. 5, 2009

(65) Prior Publication Data

US 2010/0072239 A1    Mar. 25, 2010

(30) Foreign Application Priority Data

Sep. 23, 2008    (TW) ................. 97136505 A (51) Int. Cl.
*B62J 7/04*    (2006.01)

(52) U.S. Cl. ........ 224/444; 224/451; 224/424; 224/446; 224/453; 224/462

(58) Field of Classification Search ............... 224/42.32, 224/42.34, 422, 424, 444, 446, 462, 448–457
See application file for complete search history.

(56) References Cited

U.S. PATENT DOCUMENTS

| 2,536,570 A | * | 1/1951 | Rehn | .............................. 224/446 |
| 2,539,381 A | * | 1/1951 | Bachmann | ..................... 224/446 |

\* cited by examiner

*Primary Examiner* — Justin Larson
*Assistant Examiner* — Adam Waggenspack
(74) *Attorney, Agent, or Firm* — Muncy, Geissler, Olds & Lowe, PLLC (57) ABSTRACT

A bicycle carrier includes a main body, at least one supporting frame, at least one side frame and at least one restrainer. The main body includes a supporting plane and a plurality of slide bases. The slide bases are located on at least one side of the main body. The supporting frame connects the main body and the bicycle. The side frame includes at least one slide rod that slides and couples to the slide bases and at least one fence connected to the slide rod to define a container space. The restrainer restrains the side frame from moving relative to the main body.

11 Claims, 8 Drawing Sheets

CARRIER FOR BICYCLE

RELATED APPLICATIONS

This application claims priority to Taiwan Application Serial Number 97136505, filed Sep. 23, 20068, which is herein incorporated by reference.

BACKGROUND

1. Field of Invention

The present invention relates to a bicycle fitting. More particularly, the present invention relates to an attached bicycle carrier.

2. Description of Related Art

Energy saving and carbon reduction concerns have mad bicycles increasingly popular, and therefore the bicycle fittings become popular too. The attached carrier is one of the most practical and popular bicycle fittings.

Previously the attached carrier is usually installed between the vertical pipe frame and the rear wheel frame. And the carrier is merely a plate binder or an aluminum plate. However, the plate binder or the aluminum plate is not suitable to carry wide variety kinds of goods with different shapes and sizes. The drawbacks of the previous embodiments are as follows:

First, small goods usually cannot be fastened by the plate binder since they may easily slip out when the bicycles sways or swerves. The user has to put them into a bag, and hang the bag on the handle. However, the bag hanged on the handle may affect the operation of the bicycle and further become dangerous. Secondly, several users carry the bags on their backs. However, the bags not only make the user sweat, but also become a burden. Third, the plate binder or the aluminum plate is unsuitable to carry the non-plate goods such as a basketball or baseball bat.

In view of the drawbacks of the prior art, the inventor of the present invention based on years of experience in the related industry to conduct extensive research and experiments, and finally developed a bicycle telescopic carrier in accordance with the present invention to overcome the aforementioned drawbacks.

SUMMARY

According to one embodiment of the present invention, a carrier for a bicycle includes a main body, at least one supporting frame, at least one side frame and at least one restrainer. The main body includes a supporting plane and a plurality of slide bases. The slide bases are located on at least one side of the main body. The supporting frame connects the main body and the bicycle. The side frame includes at least one slide rod that slides and couples to the slide bases and at least one fence connected to the slide rod to define a container space. The restrainer restrains the side frame from moving relative to the main body.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
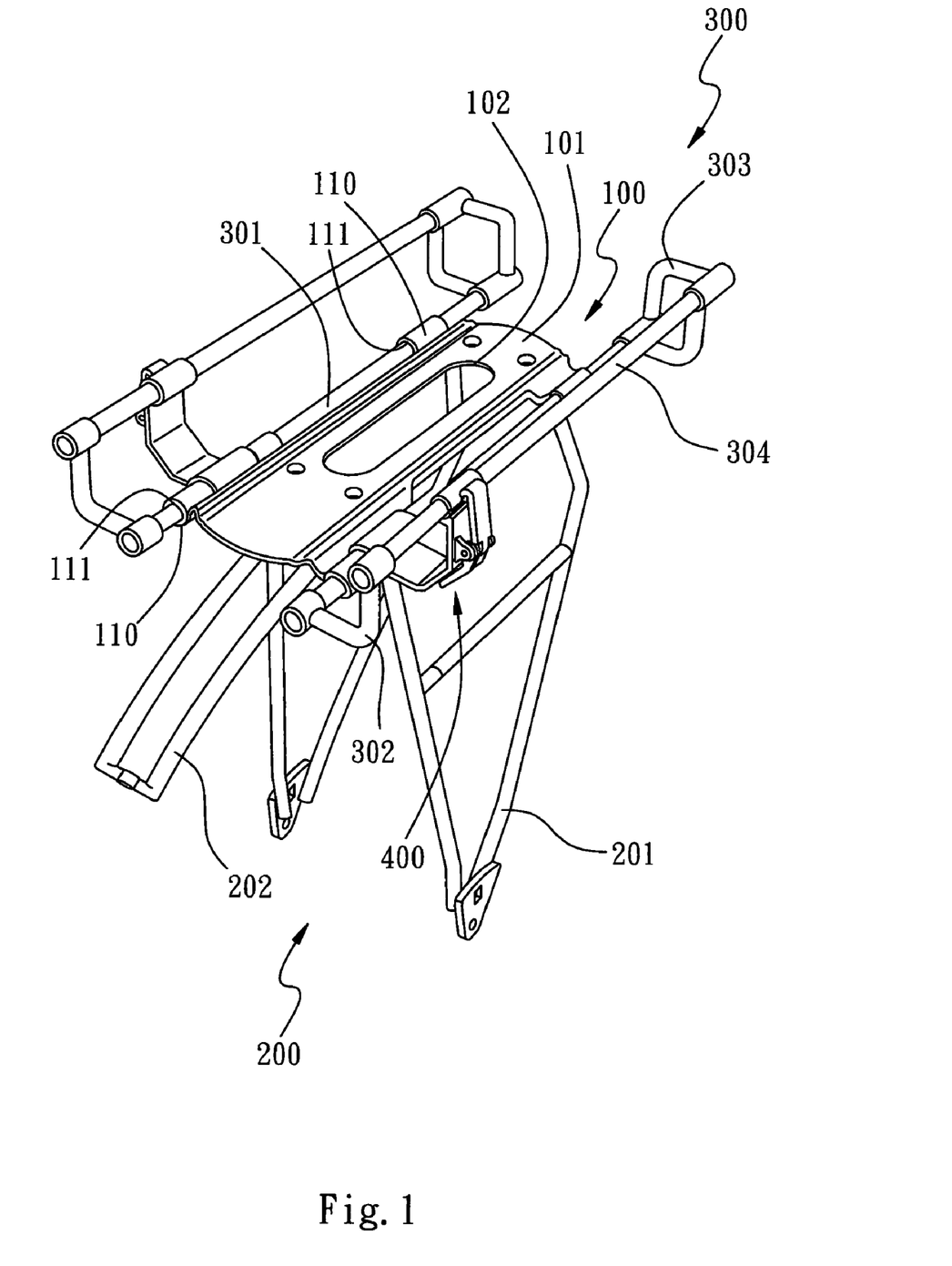
FIG. 1 is a three-dimensional view of a carrier for a bicycle according to one embodiment of the present invention.
Figure 2:
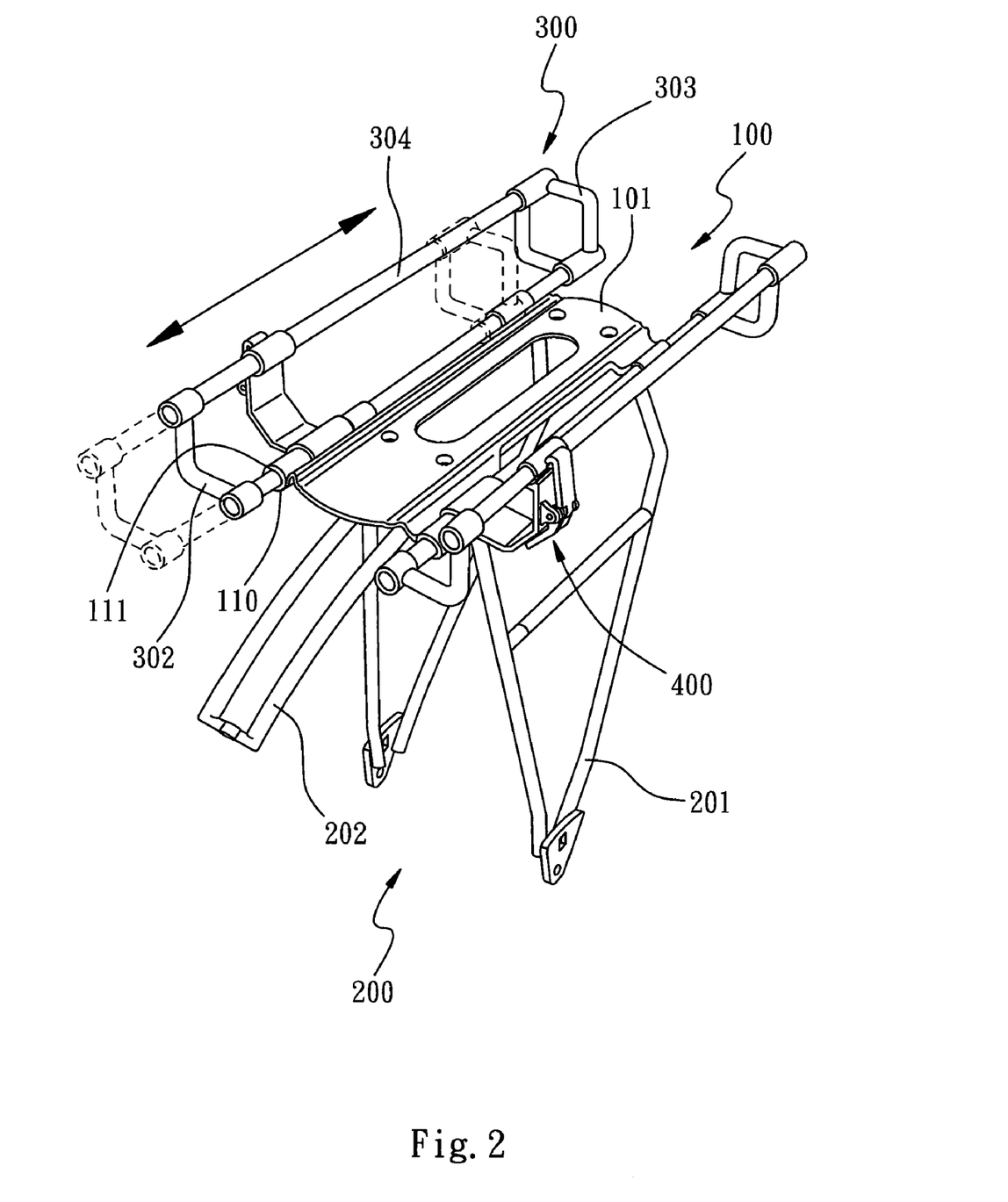
FIG. 2 is a three-dimensional view of the carrier of FIG. 1, showing the carrier in movable position.
Figure 3:
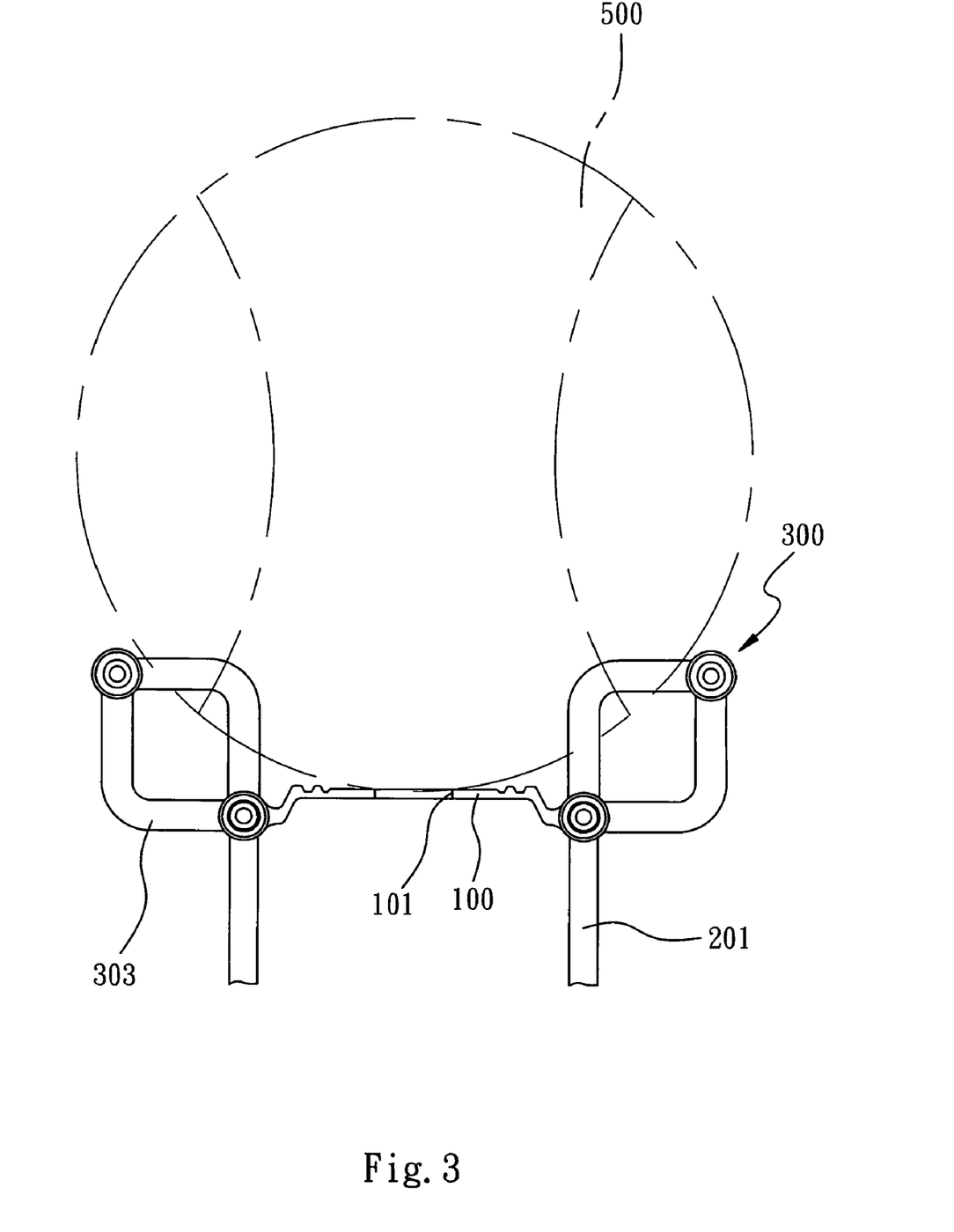
FIG. 3 is a back view of the side frame of FIG. 1, showing the side frame in one operating mode.

Please refer to FIG. 1, FIG. 2, and FIG. 3. FIG. 1 is a three-dimensional view of a carrier for a bicycle according to one embodiment of the present invention. FIG. 2 is a three-dimensional view of the carrier of FIG. 1, showing the carrier in movable position. FIG. 3 is a back view of the side frame of FIG. 1, showing the side frame in one operating mode.

The carrier of FIG. 1 includes a main body 100, at least one supporting frame 200, two side frames 300, and two restrainers 400. The side frames 300 are located at two sides of the main body 100 and opposite to each other. Each of the restrainers 400 is located between each of the side frames 300 and the main body 100. The detail descriptions are as following:

The main body 100 includes a supporting plane 101 and a plurality of slide bases 110. The supporting plane 101 is an aluminum plate and has a hollow hole 102 to contain non-plate goods, such as the basketball. The slide bases 110 are located on at least one side of the main body 100. Specifically, the slide bases 110 may be arranged on the opposite sides of the main body 100 and substantially parallel to the driving direction of the bicycle.

The supporting frame 200 connects the main body 100 and the bicycle. The supporting frame 200 includes a rear wheel frame 201 and a stand pipe frame 202. The rear wheel frame 201 connects the rear wheel pivot and the main body 100 to strengthen the load ability of the supporting plane 101. The stand pipe frame 202 connects the rear wheel frame 201 and the bicycle. Particularly, the main body 100 may be fastened on the bicycle by the rear wheel frame 201 and the stand pipe frame 202 via fastening means, such as a screw.

Each of the side frames 300 includes at least one slide rod 301 and a fence. The rod 301 slides and couples to the slide bases 110, and the fence is connected to the slide rod 301 to define a container space. Specifically, each of the slide bases 110 is a bulge component with a hole 111, and the slide rod 301 passes through the hole 111. In other words, the slide rod 301 of the side frame 300 is movably inserted into the holes 111 of the slide bases 110, such that the side frames 300 is movable via the slide rod 301, and the side frames 300 can be pivotally rotated via the slide bases 110 as well.

The fence includes an L-shaped frame 302, a rectangular frame 303, and a side rod 304. The L-shaped frame 302 and the rectangular frame 303 are connected to opposite ends of the slide rod 301, wherein the rectangular frame 303 is connected to the back end of the slide rod 301. The side rod 304 connects the L-shaped frame 302 and the rectangular frame 303. The rectangular frame 303, the slide rod 301, and the side rod 304 define a containing space. Particularly, the side frames 300 may be unequal scale L-shaped. In other words, the side frame 300 has a long side and a short side. Generally speaking, the long side is horizontal to the supporting plane 101, and the short side is vertical to the supporting plane 101, and vice versa.

Figure 7:
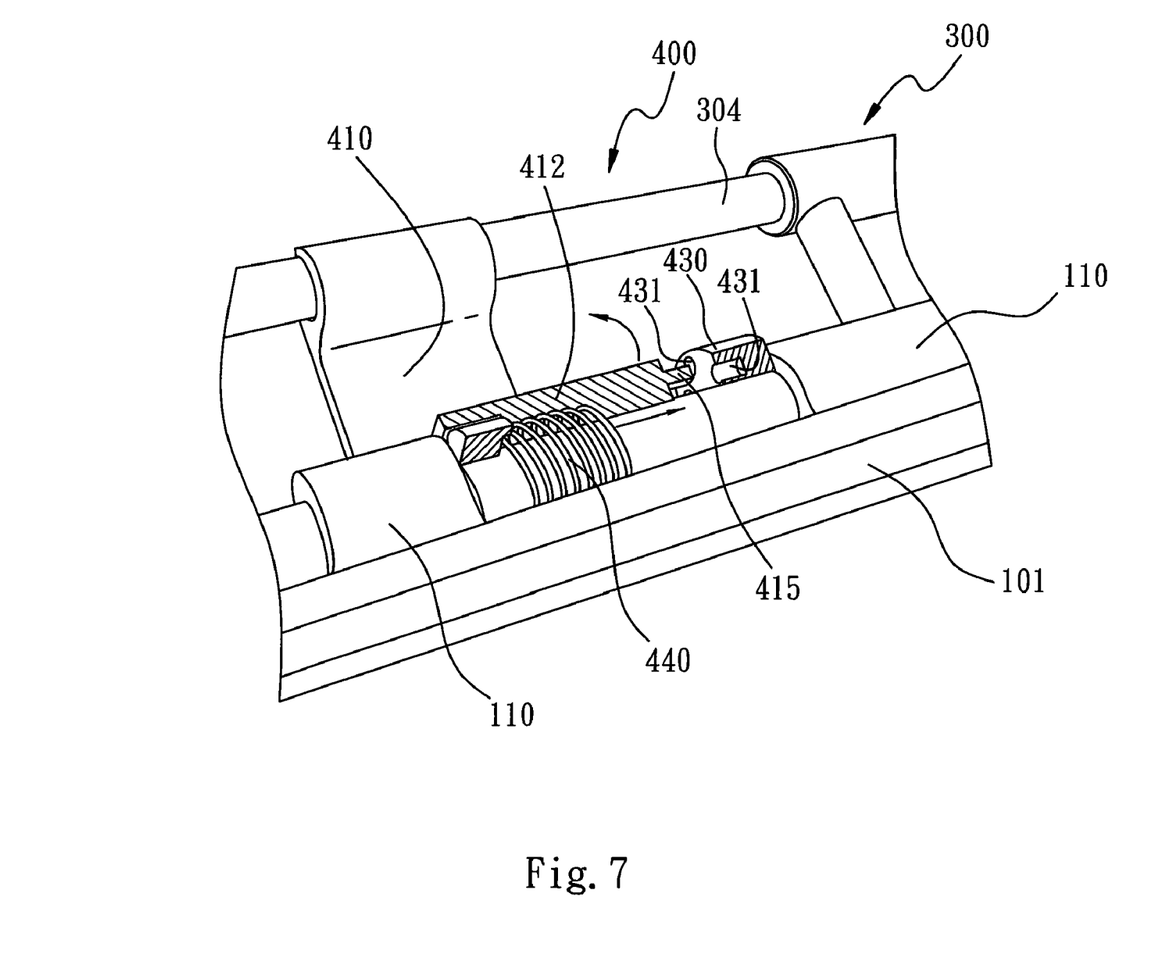
FIG. 7 shows a portion of the restrainer of FIG. 1 in detail.
Figure 8:
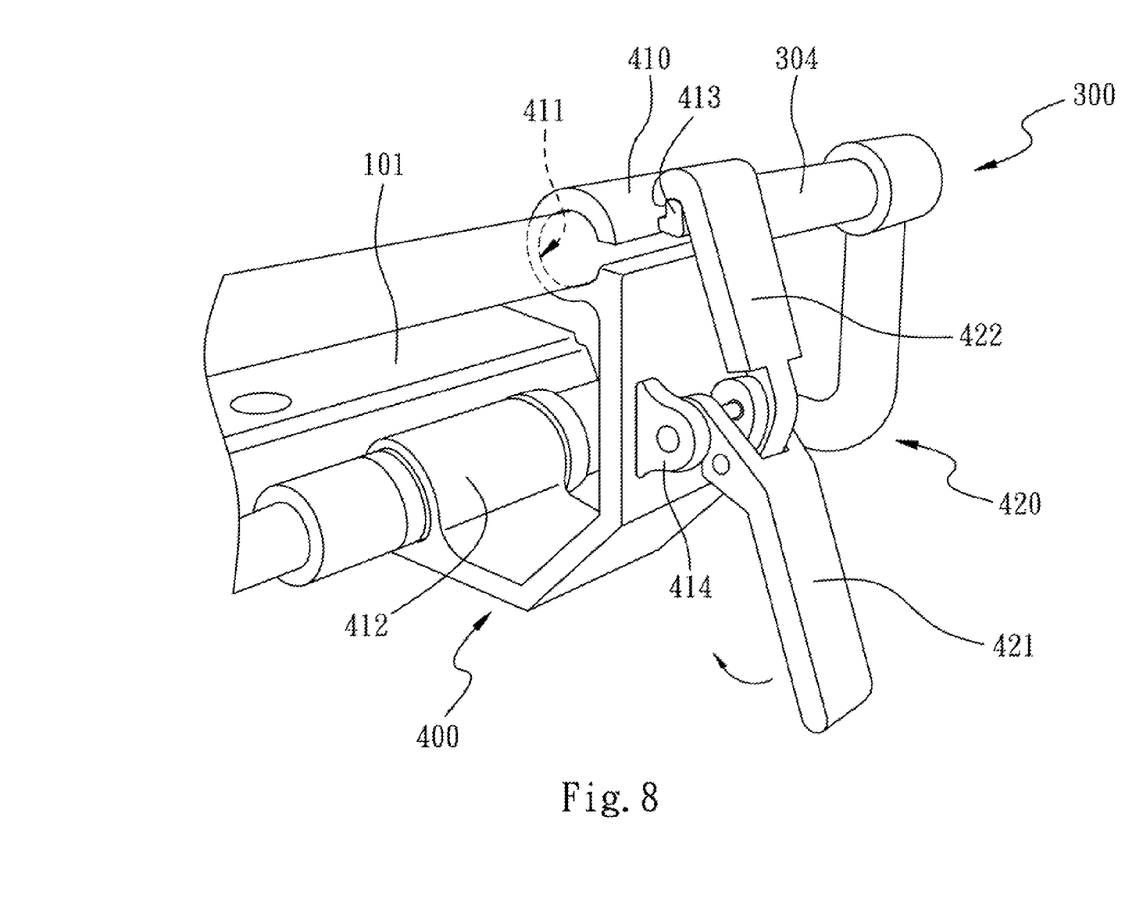
FIG. 8 shows another portion of the restrainer of FIG. 1 in detail.

The restrainer 400 restrains the side frame 300 from moving relative to the main body 100. FIGS. 7 and 8 show the restrainer 400 of FIG. 1 in detail. The restrainer 400 is disposed between the side frame 300 and the main body 100. The restrainer 400 includes a holder 410, a clamper 420, a pivot seat 412, a ring 430 and a spring 440. The components mentioned above can be combined to restrain the side frame 300 from sliding and/or rotating relative to the main body 100.

The components to restrain the side frame 300 from sliding relative to the main body 100 include the holder 410, the pivot seat 412, and the clamper 420. The holder 410 includes a slot 411, a protrusion 413 and a connecting part 414. The holder 410 holds the side rod 304 via the slot 411 such that the cross section of the holder 410 is C shaped. The holder 410 further connects the pivot seat 412 via the connecting part 414. The pivot seat 412 is pivotally connected to the slide rod 301. The protrusion 413 is located on the holder 410 and above the slot 411. The clamper 420 includes a hook bar 422 and a handle 421, and the hook bar 422 connects a hook. The hook bar 422 is pivotally connected to the connecting part 414, and the hook located on the hook bar 422 catches the protrusion 413. In other words, the handle 421 connects the hook bar 422, and the clamper 420 uses the hook bar 422 to hook the protrusion 413, and the slide rod 301 is therefore restrained via pulling down the handle 421.

The components to restrain the rotating angle of the side frame 300 include a ring 430, a plurality of bars 415 and a spring 440. The ring 430 is coupled to the slide rod 301 and located between one of the slide bases 110 and the pivot seat 412, and the ring 430 includes a plurality of recesses 431 arranged on one side of the ring 430. The bars 415 are located on the pivot seat 412 and embedded into the recesses 431 respectively to restrain the rotating angle of the side frame 300. The spring 440 is located between another one of the slide bases 110 and the pivot seat 412. Therefore, the side frame 300 is rotatable by inserting the bars 415 to the recesses 431 to restrain the side frame 300 in one angle, and further use the pivot seat 412 to push the spring 440 to form a space that enables the bars 415 to exit from the recesses 431 to adjust the side frame 300 to rotate to the other angle.

The operation of the embodiment is described as following. Please refer to FIG. 2 for a three-dimensional view of the carrier of FIG. 1, showing the carrier in movable position. The side frame 300 can be moved forward or backward and further restrained by coordinating with the restrainer 400. The rectangular frame 303 is for pressing the backside of the goods to fix the goods firmly. Please further refer to FIG. 3, FIG. 4, FIG. 5 and FIG. 6 for describing the operating modes of the side frame 300.

As shown in FIG. 3, the side frame 300 is a L-shaped structure, i.e. a long side and a short side. The long side can be moved backward to increase the containing space, and the short side is for blocking the goods. Therefore, the side frame 300 with the hollow hole 102 of the main body 100 can fix a globe 500 firmly.

Figure 4:
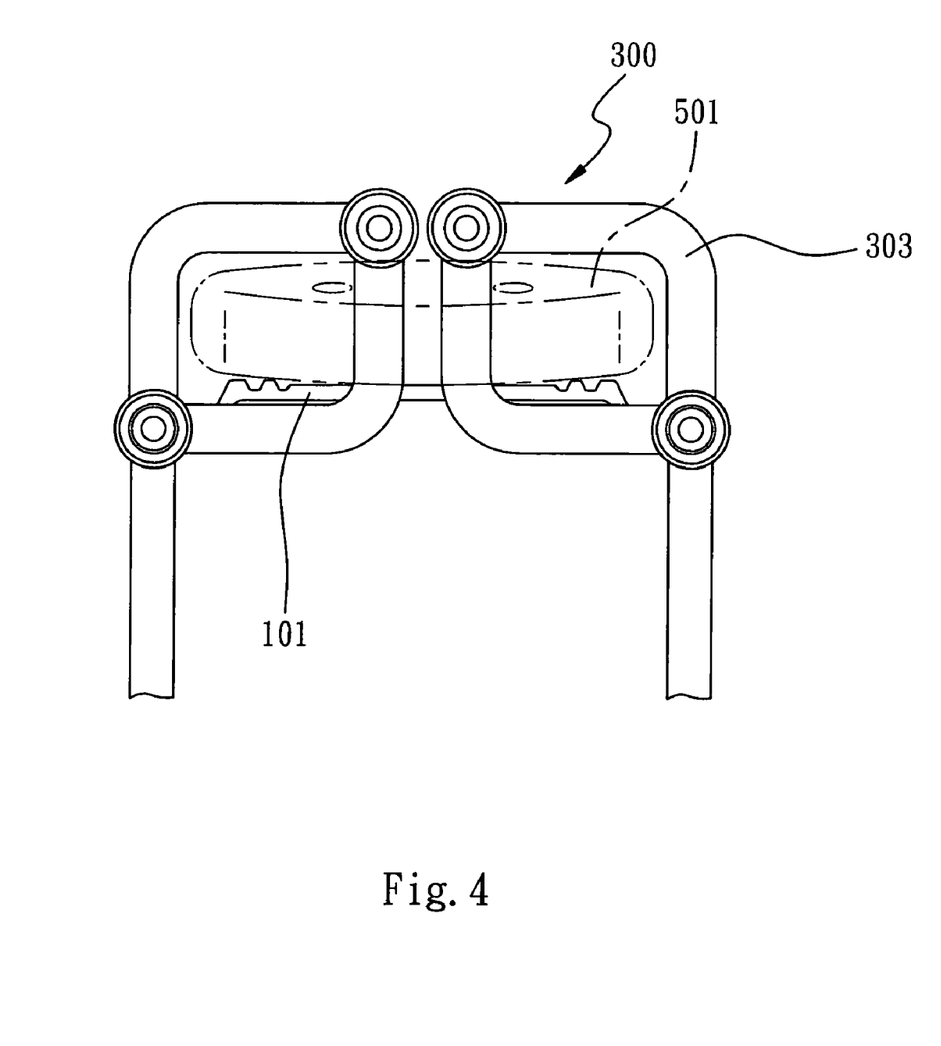
FIG. 4 is a back view of the side frame of FIG. 1, showing the side frame in another operating mode.
Figure 5:
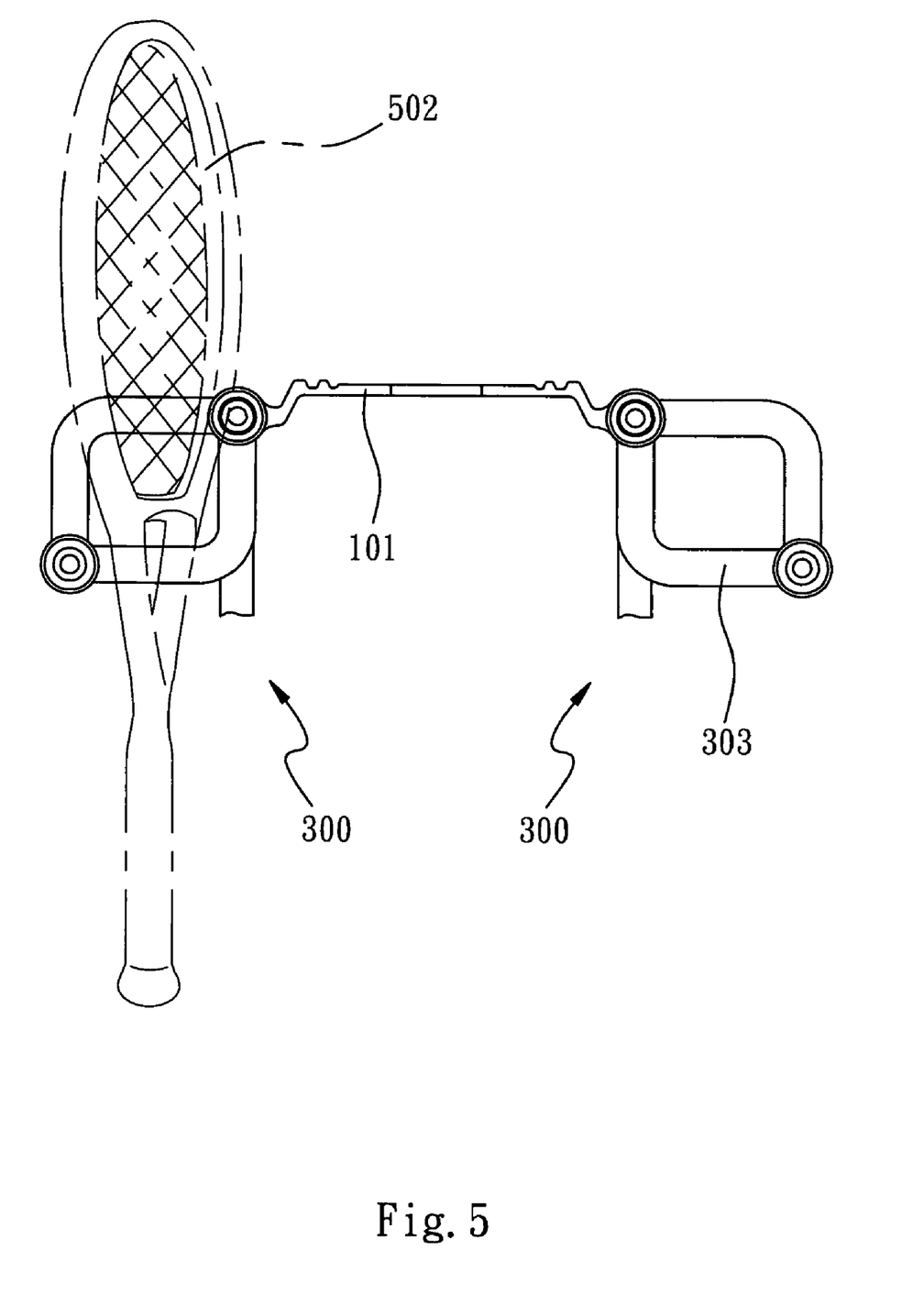
FIG. 5 is a back view of the side frame of FIG. 1, showing the side frame in yet another operating mode.
Figure 6:
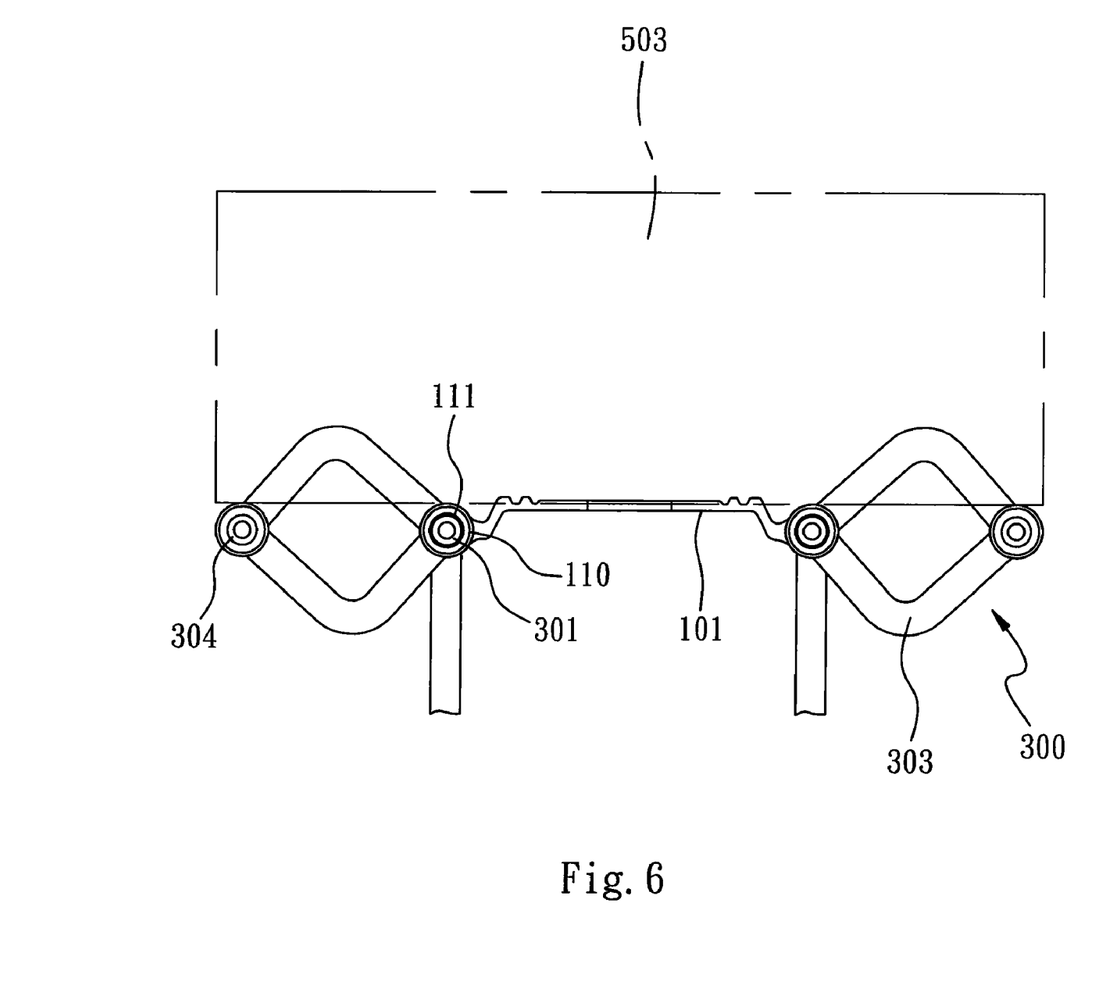
FIG. 6 is a back view of the side frame of FIG. 1, showing the side frame in still another operating mode.

When the side frames 300 are rotated near to the main body 100, as shown in FIG. 4, the slide rod 301 can be applied to press the plate goods, such as the book, raincoat and the handbag. And when the side frames 300 are rotated out from the main body 100, as shown in FIG. 5, the slide rod 301, L-shaped frame 302 and the rectangular frame 303 can form a containing space to carry the racket 502. The hollowed out space of the rectangular frame 303 is able to firmly hold a tennis bat. Please refer to FIG. 6, when the side frames 300 are rotated to an even level with the supporting plane 101 of the main body 100, the embodiment provides a large containing space for a large box 503.

The embodiments mentioned above can be assisted by other fittings such as a rope, a belt and a basket. The components of the restrainer 400 to restrain the telescopic length can be realized by the clasp components with the oppression and holding function. The components to restrain the rotating angle can be realized by the bump and embedded device with the automatic recover function. The designs of the components mentioned above can be combined together to achieve the restrainer, and other designs such as the screw and the easy fasteners also can be applied in the embodiments as the equivalent components.

While the present invention has been described by way of example and in terms of a preferred embodiment, it is to be understood that the present invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A carrier for a bicycle, the carrier comprising:
   a main body comprising a supporting plane and a plurality of slide bases located on at least one side of the main body;
   at least one supporting frame for connecting the main body and the bicycle;
   at least one side frame comprising at least one slide rod that slides and couples to the slide bases and at least one fence connected to the at least one slide rod to define a container space, wherein each of the slide bases is a bulge component with a hole, and the at least one slide rod passes through the hole, and the fence comprises an L-shaped frame and a rectangular frame connected to opposite ends of the at least one slide rod; and
   at least one restrainer restraining the side frame from moving relative to the main body, the restrainer comprising:
   a holder holding the side rod, wherein the holder comprises a slot such that the cross section of the holder is C shaped;
   a pivot seat pivotally connected to the at least one slide rod;
   a connecting part connecting the holder and the pivot seat;
   a protrusion located on the holder and above the slot;
   a hook bar pivotally connected to the connecting part; and
   a hook located on the hook bar to catch the protrusion.

2. The carrier of claim 1, wherein the rectangular frame is connected to the back end of the at least one slide rod.

3. The carrier of claim 1, wherein the fence comprises a side rod connecting the L-shaped frame and the rectangular frame.

4. The carrier of claim 1, wherein the restrainer comprises:
   a handle connected to the hook bar.

5. The carrier of claim 1, wherein the restrainer comprises:
   a ring coupled to the at least one slide rod and located between one of the slide bases and the pivot seat, wherein the ring comprises a plurality of recesses arranged on one side of the ring;
   a plurality of bars located on the pivot seat and embedded in the recesses respectively; and
   a spring located between another one of the slide bases and the pivot seat.

6. The carrier of claim 1, wherein said rectangular frame is located at the back end of said fence.

7. The carrier of claim 1, wherein the main body is an aluminum plate.

8. The carrier of claim 1, further comprising:

a screw for fastening the supporting frame to the bicycle.

9. The carrier of claim 1, wherein the slide bases are arranged on the opposite sides of the main body.

10. The carrier of claim 1, wherein the supporting frame comprises a rear wheel frame and a vertical pipe frame.

11. The carrier of claim 1, wherein the side frame is an unequal scale L-type structure in which two legs of the side frame are not of equal length.

* * * * *